United States Patent

Kitajima et al.

Patent Number: 5,364,422
Date of Patent: Nov. 15, 1994

[54] CBN GRINDING WHEEL

[75] Inventors: Masato Kitajima, Hekinan; Shinji Soma, Handa; Akimitsu Kamiya; Akira Suzuki, both of Okazaki; Yasuhisa Sekiya, Toyohashi; Tomohiro Inagaki, Anjo, all of Japan

[73] Assignees: Toyoda Koki Kabushiki Kaisha, Kariya; Toyoda Van Moppes Kabushiki Kaisha, Okazaki, both of Japan

[21] Appl. No.: 15,338

[22] Filed: Feb. 9, 1993

[30] Foreign Application Priority Data

Feb. 20, 1992 [JP] Japan ................................. 4-033321

[51] Int. Cl.$^5$ .............................................. B24D 3/04
[52] U.S. Cl. ......................................... 51/307; 51/309; 451/541
[58] Field of Search .................... 51/309, 206 R, 207, 51/293, 295, 307

[56] References Cited

U.S. PATENT DOCUMENTS

| | | | |
|---|---|---|---|
| 4,591,364 | 5/1986 | Phaal | 51/309 |
| 4,923,490 | 5/1990 | Johnson et al. | 51/309 |
| 4,944,773 | 7/1990 | Rue et al. | 51/309 |
| 5,090,970 | 2/1992 | Rue et al. | 51/309 |
| 5,110,322 | 5/1992 | Narayanan et al. | 51/307 |
| 5,152,810 | 10/1992 | Rue et al. | 51/309 |

FOREIGN PATENT DOCUMENTS

| | | | |
|---|---|---|---|
| 0051090 | 4/1979 | Japan | 51/307 |
| 62-57874 | 3/1987 | Japan . | |
| 2148159 | 7/1987 | Japan | 51/307 |
| 63-34070 | 2/1988 | Japan . | |
| 0074567 | 4/1988 | Japan | 51/307 |
| 2-145261 | 6/1990 | Japan . | |
| 2-284872 | 11/1990 | Japan . | |
| 3-311269 | 12/1990 | Japan . | |

*Primary Examiner*—Robert A. Rose
*Attorney, Agent, or Firm*—Oblon, Spivak, McClelland, Maier & Neustadt

[57] ABSTRACT

A CBN grinding wheel having a circular core and an abrasive layer formed on the peripheral surface of the core. The abrasive layer comprises high toughness CBN grains and medium toughness CBN grains, wherein the high toughness CBN grains are incorporated into the abrasive layer in a ratio of 10-80% by weight with respect to the total amount of the CBN grains.

5 Claims, 2 Drawing Sheets

CBN GRINDING WHEEL

BACKGROUND OF THE INVENTION

1. Field of the Invention

This invention relates to a CBN grinding wheel containing CBN (Cubic Boron Nitride) grains.

2. Prior Art of the Invention

Vitrified CBN wheels are conventionally used for high efficient grinding of workpieces. Such vitrified CBN wheels have a disadvantage that it gradually becomes difficult to grinding workpieces with a sufficient surface roughness as the cumulative grinding amount by the grinding wheel increases. In a conventional grinding machine, therefore, truing of the grinding wheel is carried out before the surface roughness of workpieces exceeds a predetermined specification limit, so that the initial surface roughness is obtained again.

It is considered that the deterioration of surface roughness is mainly caused by the breakage of the CBN abrasive grains and the drop out of the CBN abrasive grains. To reduce the breakage of the CBN abrasive grains, it is required to use CBN abrasive grains having a high toughness or a low friability. However, when the CBN abrasive grains having a high toughness are used, the drop out of the CBN grains occurs more easily. To reduce the drop out of the CBN abrasive grains, it is also required to increase the amount of the bond to increase the ability of holding the abrasive grains. However, when the amount of the bond is increased, the number of pores in the abrasive layer of the grinding wheel decreases, whereby it becomes difficult to smoothly discharge tips of workpieces from the grinding wheel. This causes deterioration of the form tolerance of workpieces, and surface burn of the workpieces.

SUMMARY OF THE INVENTION

Accordingly, it is an object of the present invention to provide an improved CBN grinding wheel which is capable of accurately grinding workpieces and which has a long service life.

It is another object of the present invention to provide an improved CBN grinding wheel which is capable of accurately grinding workpieces for a longer time without truing operation, thereby prolonging the time interval of the truing operation.

Briefly, a grinding wheel according to the present invention has an abrasive layer which comprises first single crystal CBN grains, second single crystal CBN grains whose toughness is different from the toughness of the first CBN grains, and a vitrified bond for bonding the first CBN grains and second CBN grains, wherein the first CBN grains have a toughness greater than that of the second CBN grains.

With this configuration, a larger number of workpieces can be ground before the surface roughness is deteriorated and reaches a predetermined specification limit, as compared to the conventional grinding wheels. This enables to prolong the time interval of truing operation, thereby increasing the service life of the grinding wheel, and decreasing the grinding cost including the cost of the grinding wheel.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which.

DETAILED DESCRIPTION OF PREFERRED EMBODIMENT

Figure 1:
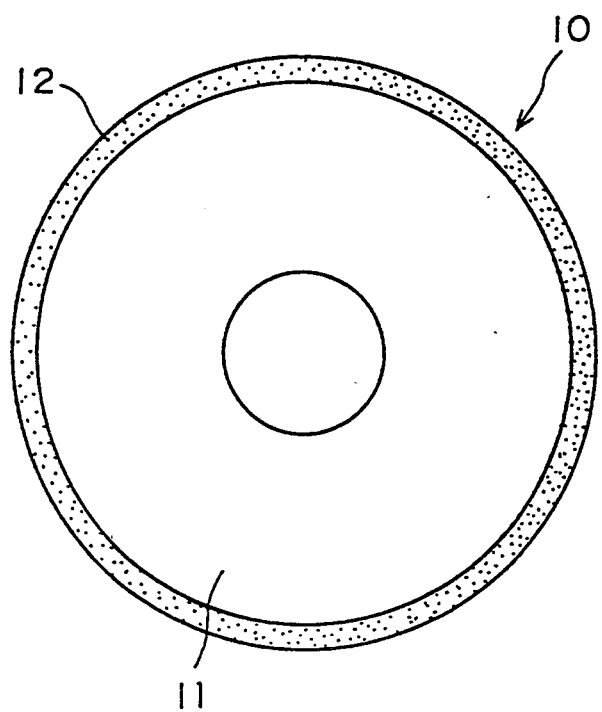
FIG. 1 is a side view of a vitrified CBN grinding wheel according to an embodiment of the present invention.
Figure 2:
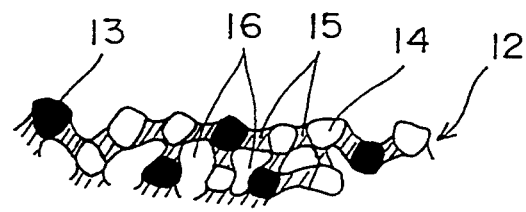
FIG. 2 is an enlarged sectional view of a part of the abrasive layer shown in FIG. 1.

A preferred embodiment of the present invention will be now described with reference to drawings. In FIG. 1, numeral 10 denotes a vitrified CBN grinding wheel, in which an abrasive layer 12 is formed on the outer peripheral surface of a circular core 11 made of steel. As shown in FIG. 2, the abrasive layer 12 contains CBN abrasive grains 13 having a high toughness (hereinafter referred to as "high toughness CBN grains") and CBN abrasive grains 14 having a toughness lower than the high toughness CBN grains (hereinafter referred to as "medium toughness CBN grains"). It is preferred that theses high toughness and medium toughness CBN grains are included in the abrasive layer 12 in such a way that the weight ratio of the high toughness CBN grains to the all of the grains falls in a range of 10–80%.

Examples of CBN abrasive grains useful in the present invention are shown in the following Table 1.

TABLE 1

| Group | Name of Abrasive Grains | Relative Friability |
|---|---|---|
| G1 | 500 (Product of General Electric Co.) SBN-M (Product of Showa Denko Co.) | 60–70 |
| G2 | Type-I (Product of General Electric Co.) SBN-B (Product of Showa Denko Co.) ABN-600 (Product of De Beers Co.) | 50–60 |
| G3 | ABN-300 (Product of De Beers Co.) | 48–50 |

Since the toughnesses of the abrasive grains are in proportion to their relative friability indexes, the respective groups have the following relation in terms of their toughness.

$$G1 > G2 > G3 > G4$$

In the following example, the abrasive grains of SBN-M in the group G1 are used as the high toughness CBN grains and the abrasive grains of SBN-B in the group G2 are used as the medium toughness CBN grains. However, it is possible to employ different combinations, namely, combinations of abrasive grains in the groups G2 and G3, of abrasive grains in the groups G1 and G3.

The CBN abrasive layer 12 of the grinding wheel 10 is manufactured by a process in which the high toughness CBN grains, the medium toughness CBN grains and a vitrified bond are initially mixed, and the mixture is then put into a mold to be shaped in a desired shape. The mixture is then baked to obtain a vitrified CBN grinding wheel having a desired shape. During the baking process, pores 16 are formed due to the contraction of the vitrified bond 15, as shown in FIG. 2.

Although the abrasive layer 12 has a ring-like shape in the present embodiment, the abrasive layer 12 may be composed of plural segmented grinding chips. In such case, each of the grinding chips is manufactured by a manner similar to the above.

EXAMPLE

Three grinding wheels A, B and C shown in Table 2 were made using the abrasive grains SBN-M which have diameters between about 100 microns and about 130 microns or which had passed a first sieve having No. 120 mesh but had not passed a second sieve having No. 140 mesh, and the abrasive grains SBN-B which have diameters between about 150 microns and about 190 microns or which had passed a third sieve having No. 80 mesh but had not passed a fourth sieve having No. 100 mesh.

TABLE 2

| Abrasive Grain | Grinding wheel A | Grinding wheel B | Grinding wheel C |
|---|---|---|---|
| | | | (% by weight) |
| SBN-M (High toughness) | 100 | 0 | 30 |
| SBN-B (Med. toughness) | 0 | 100 | 70 |

Using the above grinding wheels A, B and C, tests on service life and grinding accuracy were carried out.

Test on Service Life

A first test was carried out to study the relationship between the service life and the mixture ratio of the high toughness CBN grains and the medium toughness CBN grains.

Workpieces were ground by using respective grinding wheels A, B and C until the surface roughness of the workpieces reaches a predetermined specification limit UL.

Figure 3:
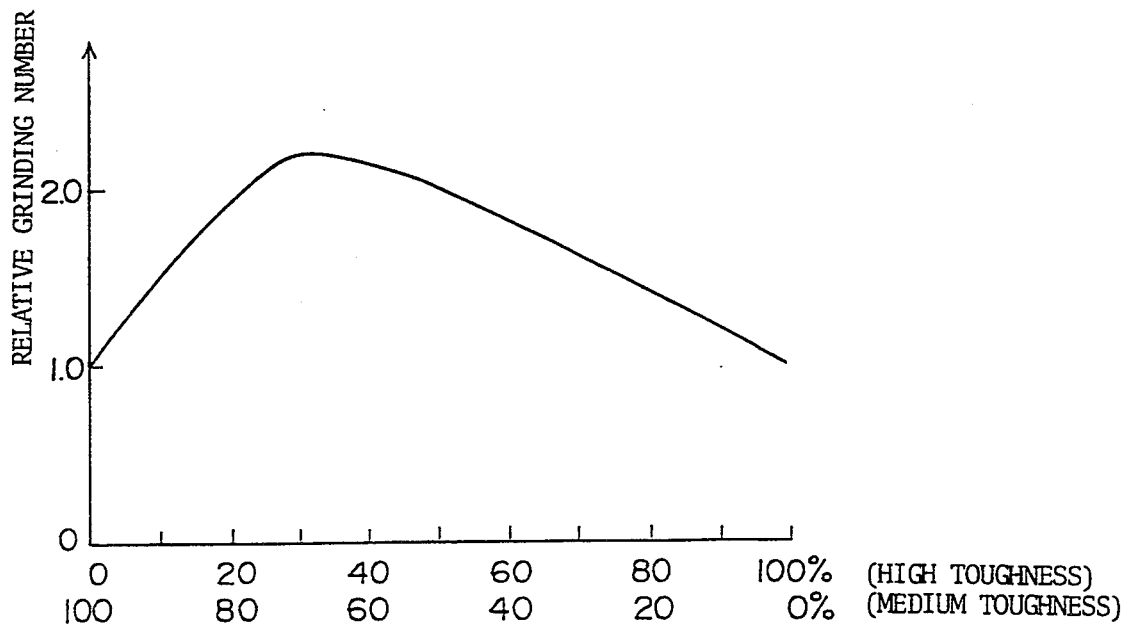
FIG. 3 is a graph showing the result of a first test in which there is shown a change of service life with respect to a change of the mixture ratio of high toughness CBN grains and medium toughness CBN grains.

FIG. 3 is a graph showing the result of the first test in which the service life is indicated by relative grinding number. Namely, the number of workpieces ground by the grinding wheel B including the medium toughness CBN grains only is used as standard, and the relative grinding number of such grinding wheel is indicated as 1.0. The curve show a relation between the service life and the mixture ratios, which is predicted based on the test results.

As is understood from the graph, the relative grinding number sharply increases as the mixture ratio of the high toughness CBN grains 13 increases, and the relative grinding number reaches its maximum when the mixture ratio of the high toughness CBN grains 13 is 30% and the mixture ratio of the medium toughness CBN grains 14 is 70%. When the mixture ratio of the high toughness CBN grains further increases, the relative grinding number gradually decreases and becomes 1 when the mixture ratio of the high toughness CBN grains 13 reaches 100%.

It is considered that such phenomenon is occurred due to the following facts. When the ratio of the high toughness CBN grains 13 is equal to or close to 100% the breakage of the grains hardly occurs. In such case, however, the relative grinding number does not become high because of the drop of the high toughness CBN grains 13. When the ratio of the medium toughness CBN grains 14 is equal to or close to 100% the relative grinding number does not become high, because the breakage of the CBN grains easily occurs. On the contrary, when the high toughness CBN grains 13 and the medium toughness CBN grains 14 are mixed in a proper ratio, it becomes possible to generate sharp edges on the medium toughness CBN grains 14 by the breakage thereof, whereby the medium toughness CBN grains 14 efficiently take part in the grinding operation. This lowers the grinding force acting on the high toughness CBN grains 13, thereby preventing the high toughness CBN grains 13 from dropping. Taking the above facts into consideration, the preferred mixture ratio of the high toughness CBN grains is 10–80% by weight with respect to the total amount of the CBN grains.

Test on Grinding Accuracy

Figure 4:
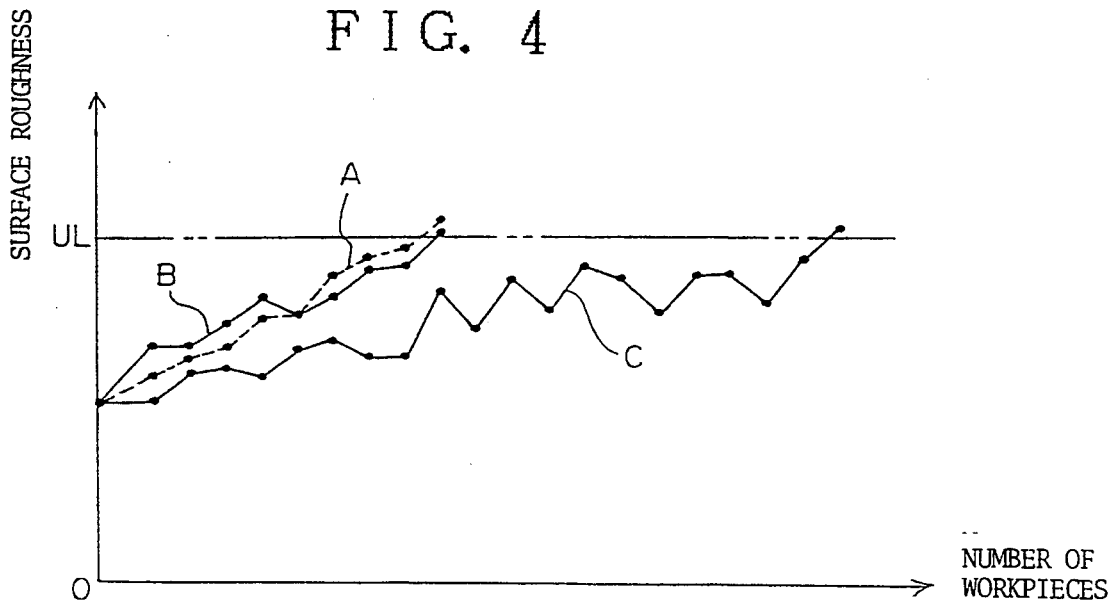
FIG. 4 is a graph showing the result of a second test in which there are shown changes of surface roughness with respect to an increase of the number of ground workpieces.

A second test was carried out using the grinding wheels A, B and C to find changes of surface roughness with respect to an increase of the number of workpieces which had been ground by the respective grinding wheels. FIG. 4 shows the result of the second test.

As is understood from the graph, with the grinding wheel C including the high toughness CBN grains 13 and the medium toughness CBN grains 14 in a proper ratio, a larger number of workpieces can be ground until surface roughness reaches the specification limit UL, compared to the grinding wheel A containing the high toughness CBN grains 13 only and the grinding wheel B containing the medium toughness CBN grains 14 only.

Although the high toughness CBN grains 13 have smaller grain diameters compared to the medium toughness CBN grains 14 in the above embodiment, the grain diameters of the high toughness CBN grains 13 may be equal to or larger than those of the medium toughness CBN grains.

Obviously, numerous modifications and variations of the present invention are possible in light of the above teachings. It is therefore to be understood that within the scope of the appended claims, the present invention may be practiced otherwise than as specifically described herein.

What is claimed is:

1. A grinding wheel having an abrasive layer which comprises:
    first single crystal CBN grains having a predetermined toughness;
    second single crystal CBN grains having a different toughness compared to said first single crystal CBN grains; and
    a vitrified bond for bonding said first single crystal CBN grains and second single crystal CBN grains, wherein said first single crystal CBN grains have a toughness larger than the toughness of said second single crystal CBN grains.

2. A grinding wheel according to claim 1, wherein said first single crystal CBN grains are incorporated into said abrasive layer in a ratio of 10–80% by weight with respect to the total amount of said first and second single crystal CBN grains.

3. A grinding wheel according to claim 2, wherein said first single crystal CBN grains are incorporated into said abrasive layer in a ratio of about 30% with respect to the total amount of said first and second single crystal CBN grains.

4. A grinding wheel according to claim 3, wherein said first single crystal CBN grains have smaller grains sizes compared to said second single crystal CBN grains.

5. A grinding wheel according to claim 4, wherein said first single crystal CBN grains have diameters between about 100 microns and about 130 microns, said second single crystal CBN grains have diameters between about 150 microns and 190 microns.

* * * * *